United States Patent
Blaney et al.

(10) Patent No.: US 11,104,617 B2
(45) Date of Patent: *Aug. 31, 2021

(54) PHOSPHORUS EXTRACTION AND RECOVERY SYSTEM (PEARS)

(71) Applicant: UNIVERSITY OF MARYLAND, BALTIMORE COUNTY, Baltimore, MD (US)

(72) Inventors: Lee Blaney, Baltimore, MD (US); Utsav Shashvatt, Baltimore, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,478

(22) Filed: Sep. 24, 2019

(65) Prior Publication Data
US 2020/0079699 A1     Mar. 12, 2020

Related U.S. Application Data

(63) Continuation of application No. 15/593,710, filed on May 12, 2017, now Pat. No. 10,464,852.
(Continued)

(51) Int. Cl.
*B01D 61/14*     (2006.01)
*B01D 61/18*     (2006.01)
(Continued)

(52) U.S. Cl.
CPC .............. *C05B 7/00* (2013.01); *B01D 61/142* (2013.01); *B01D 61/147* (2013.01); *B01D 61/18* (2013.01); *B01D 61/246* (2013.01); *B01J 19/06* (2013.01); *C01B 25/451* (2013.01); *C02F 1/44* (2013.01); *C02F 1/66* (2013.01); *B01D 2311/25* (2013.01);
(Continued)

(58) Field of Classification Search
CPC .... B01D 61/142; B01D 61/147; B01D 61/18; B01D 61/246; B01D 2311/25; B01D 2311/2642; B01D 2315/06; B01D 2317/025; B01J 19/06; C01B 25/451; C02F 1/44; C02F 1/66; C02F 3/1268; C02F 3/1273; C02F 9/00; C05B 7/00
See application file for complete search history.

(56) References Cited

U.S. PATENT DOCUMENTS

| 4,826,017 A | 5/1989 | Du Bourg et al. |
| 6,387,272 B2 | 5/2002 | Hirth et al. |

(Continued)

FOREIGN PATENT DOCUMENTS

WO    WO-2011089019 A1 *   7/2011 ............... C05B 7/00

OTHER PUBLICATIONS

International Search Report, PCT/US2019/054755, dated Dec. 4, 2019.
(Continued)

*Primary Examiner* — Lucas A Stelling
(74) *Attorney, Agent, or Firm* — Tristan A. Fuierer; Olive Law Group, PLLC (57) ABSTRACT

Separation methods and systems for converting high concentrations of animal wastes into nutrients and other useful products such as struvite and potassium struvite. Advantageously, the system and methods do not require the addition of external chemicals other than an acid and a base.

12 Claims, 4 Drawing Sheets

Related U.S. Application Data (60) Provisional application No. 62/335,806, filed on May 13, 2016.

(51) Int. Cl.

| | | |
|---|---|---|
| *B01D 61/24* | (2006.01) | |
| *B01J 19/06* | (2006.01) | |
| *C01B 25/45* | (2006.01) | |
| *C02F 1/44* | (2006.01) | |
| *C02F 1/66* | (2006.01) | |
| *C05B 7/00* | (2006.01) | |

(52) U.S. Cl.
CPC .. *B01D 2311/2642* (2013.01); *B01D 2315/06* (2013.01); *B01D 2317/025* (2013.01)

(56) References Cited

U.S. PATENT DOCUMENTS

| | | |
|---|---|---|
| 7,014,768 B2 | 3/2006 | Li et al. |
| 2002/0030012 A1 | 3/2002 | Sullivan et al. |
| 2005/0045557 A1* | 3/2005 | Daigger ............... C02F 3/1215 210/605 |
| 2005/0051495 A1* | 3/2005 | Bowers ............... C02F 1/68 210/714 |
| 2007/0175825 A1* | 8/2007 | Denney ............... C02F 3/34 210/631 |
| 2012/0018374 A1 | 1/2012 | Sun et al. |
| 2012/0031849 A1 | 2/2012 | Britton |
| 2012/0261334 A1 | 10/2012 | Baur |
| 2012/0261338 A1 | 10/2012 | Kuzuma et al. |
| 2013/0062289 A1 | 3/2013 | Cote et al. |
| 2013/0334144 A1 | 12/2013 | Britton |
| 2014/0231359 A1 | 8/2014 | Cote et al. |
| 2015/0017085 A1 | 1/2015 | Britton et al. |
| 2016/0130191 A1 | 5/2016 | Clark et al. |
| 2017/0174577 A1 | 6/2017 | Blaney |
| 2017/0327427 A1 | 11/2017 | Blaney et al. |

OTHER PUBLICATIONS

Ostara Pearl®; Nutrient Recovery Technology Customized to Meet Your Needs; Ostara Nutrient Recovery Technologies, Inc.; www.ostara.com.

Blaney, Lee M.; et al; "Hybrid anion exchanger for trace phosphate removal from water and wastewater," Water Research, 2007, pp. 1603-1613, vol. 41.

He, Ke, et al; "Detection of a wide variety of human and veterinary fluoroquinolone antibiotics in municipal wastewater and wastewater-impacted surface water," Journal of Pharmaceutical and Biomedical Analysis, 2015, pp. 136-143, vol. 106.

* cited by examiner

PHOSPHORUS EXTRACTION AND RECOVERY SYSTEM (PEARS)

CROSS REFERENCE TO RELATED APPLICATIONS

This application is filed under the provisions of 35 U.S.C. § 120 and is a continuation of U.S. patent application Ser. No. 15/593,710 filed on May 12, 2017, now U.S. Pat. No. 10,464,852, which claims priority to U.S. Provisional Patent Application No. 62/335,806 filed on May 13, 2016 in the name of Lee Blaney and Utsav Shashvatt and entitled "Phosphorous Extraction and Recovery System," which are both hereby incorporated by reference herein in their entirety.

STATEMENT REGARDING FEDERALLY SPONSORED RESEARCH

Funding for development of this technology came from the Maryland Industrial Partnerships program and the Maryland Department of Natural Resources.

FIELD OF THE INVENTION

The present invention relates generally to the problems associated with waste in animal confinements, and more specifically, to separation methods and systems for converting high concentrations of animal wastes into nutrients and other useful products.

BACKGROUND OF THE INVENTION

The cleanup and handling of cattle, swine and poultry manure has become a critical issue in the management and disposal of animal waste. Animals have been raised for centuries for food and previously such animals grazed in fields or pens. Current methods of raising livestock include housing in high concentrations within a confined space. Numerous drawbacks of such confinement include high concentrations of waste that must be removed from the confined space. The manure produced must be removed regularly to ensure adequate sanitation and to prevent disease.

When solid waste is used as fertilizer in fields, increased levels of phosphorus, nitrogen, and potassium are found in the soils. When liquid waste is used as fertilizer in fields, increased levels of nitrogen rich ammonium and ammonia are found in the soils. Either scenario may result in the leaching of such chemicals into drainage waters and run-off streams.

There has been increasing publicity and stricter environmental requirements and enforcement because of the continuing concern over maintaining water quality in watershed areas due to the release of manure as normal operational discharges from dairy cattle, beef cattle, swine, poultry and other concentrated animal feeding operations. Current technologies for separating solids and nutrient components of such animal waste have limitations, are costly to operate, and result in the use of large quantities of fuel and labor in order to provide solid and water-based effluents that can either be recycled or are environmentally acceptable to spread on farmlands.

Accordingly, there is currently a need for an improved process and separation system for treating animal waste that is low in capital equipment cost, low in waste transportation cost, prevents pollution of water resources, simple to operate, and that provides solid and liquid effluents containing beneficial and useful nutrients critical for food production.

SUMMARY OF THE INVENTION

The present invention relates to extraction systems and methods to process a manure source containing urine and fecal matter from cows, swine, sheep, goats, poultry, horses, rabbits and other animals to provide target products including, but not limited to, ammonia, struvite, and/or potassium struvite.

In one aspect, a phosphorus extraction and recovery system (PEARS) is described, said system comprising:
(a) an acidification reactor, wherein the acidification reactor comprises a first multi-parameter meter, first mixer, and a first membrane module;
(b) a first container in liquid communication with the acidification reactor, wherein the first container is fabricated of material that is inert to an acidic solution;
(c) a basin in liquid communication with the acidification reactor, wherein the basin is fabricated of material that is inert to a manure slurry;
(d) a second container in communication with the acidification reactor, wherein the second container is positioned so that solids that are present in the acidification reactor can be accumulated;
(e) a precipitation reactor in liquid communication with the first membrane module of the acidification reactor, wherein the precipitation reactor comprises a second multi-parameter meter, second mixer, and a second membrane module;
(f) a third container in liquid communication with the precipitation reactor, wherein the third container is fabricated of material that is inert to a basic solution;
(g) a fourth container in communication with the precipitation reactor, wherein the fourth container is positioned so that solids precipitated in the precipitation reactor can be accumulated; and
(h) a fifth container in communication with the second membrane module, wherein the fifth container is fabricated of material that is inert to liquid fertilizer.

In another aspect, a process for treating manure in order to isolate a target precipitate, said process comprising:
(a) providing a manure slurry;
(b) introducing the manure slurry into an acidification reactor, wherein the pH of the manure slurry is lowered to a range of about 4.5 to about 5.5 using at least one acid, wherein the manure slurry is mixed in the acidification reactor to instigate nutrient release;
(c) collecting nutrient-deficient solids from the acidification reactor;
(d) collecting nutrient-rich permeate in a first membrane module which is positioned in the acidification reactor, and moving the nutrient-rich solution to a precipitation reactor;
(e) initiating precipitation of the target precipitate in the precipitation reactor by raising the pH of the nutrient-rich permeate to a range of about 8.5 to about 9.2 using at least one base;
(f) collecting the target precipitate from the precipitation reactor; and
(g) collecting effluent from a second membrane module which is positioned in the precipitation reactor.

Other aspects, features and embodiments of the invention will be more fully apparent from the ensuing disclosure and appended claims.

DETAILED DESCRIPTION, AND PREFERRED EMBODIMENTS THEREOF

The present invention relates to extraction systems and methods to process a manure source containing urine and fecal matter from cows, swine, sheep, goats, poultry, horses, rabbits and other animals to provide target products including, but not limited to, ammonia, struvite, and/or potassium struvite.

The term "manure" refers to any medium that includes animal waste and may also include but is not limited to water, feed, urine, fecal matter, straw, hay, bedding material, peat moss, and composts. Manure characteristics are generally affected by diet, species and the growth stage of the animals, and the manure collection method used. Typically, animal waste manure is about 80% to about 95% liquid by weight due to urine, sloppy drinking, animal washing and flush water. As such, the manure medium may be pretreated with mechanical system to remove any unwanted material, larger solids and excess liquids from the manure medium before introduction into the system of the present invention, wherein the pretreating includes systems such as screw press, centrifuge, vibrating screen, mesh screening, belt filter, hydrocyclone and other systems that may further reduce particle size, and/or remove unwanted large material to ensure easy flow through the system described herein.

As defined herein, a "mixer" includes, but are not limited to, top stirrers/mixers, bottom stirrers/mixers, side stirrers/mixers, paddle-type mixers, screw agitators, rotary mixers, sonication, ultrasonic energy, blenders, blades, dispersers, rotors, propellers, recirculators, baffles, impellers, internal fins or augers within a reactor that result in mixing of the contents therein.

As defined herein, "struvite" ($MgNH_4PO_4.6H_2O$) and "potassium struvite" ($KMgPO_4.6H_2O$) are known to have a specific chemical formula with a specific stoichiometric ratio of atoms to one another. It should be appreciated by the person skilled in the art that atomic substitutions can occur in the crystals. Preferably, the struvite recovered has an atomic ratio of N:P of about 1:1 while the potassium struvite recovered has an atomic ratio of K:P of about 1:1.

As defined herein, a "membrane module" corresponds to a module or unit comprising a microfiltration membrane. Microfiltration membranes are well known in the art and include cross-flow filtration or dead-end filtration. Microfiltration membranes may be made of any suitable materials, such as a material selected from the group consisting of polymers, such as polypropylene, polyethylene, polysulfone, polyethersulfone, polyetherimide, polyimide, polycarbonate, polyvinylchloride, polyester, etc.; nylon, silicone, urethane, cellulose nitrate, cellulose acetate, regenerated cellulose, polyether amide, polyphenylene oxide/polysulfone blends, mixed esters of cellulose, polyether sulfone and composites of such materials. The filter membrane sheets used in the microfiltration membranes may be of any suitable porosity rating.

The system and individual compartments may be fabricated from any material that does not interact with any ions in the waste stream, the recovery stream, or the reactive chemical reservoirs including, but not limited to, polymeric, metallic or ceramic material.

The present invention generally relates to the recovery of struvite-based minerals from manure, e.g., poultry litter, using a phosphorus extraction and recovery system (PEARS). Phosphorus and other nutrients can be selectively extracted from animal manure and concentrated in high-purity solutions and solids. For example, the chemical conditions in the recovery solution can cause precipitation of valuable fertilizers such as struvite ($MgNH_4PO_4.6H_2O$) or potassium struvite ($KMgPO_4.6H_2O$). Advantageously, the present system does not require the addition of chemicals such as $Ca^{2+}$, $Mg^{2+}$, and $NH_4^+$.

Figure 1:
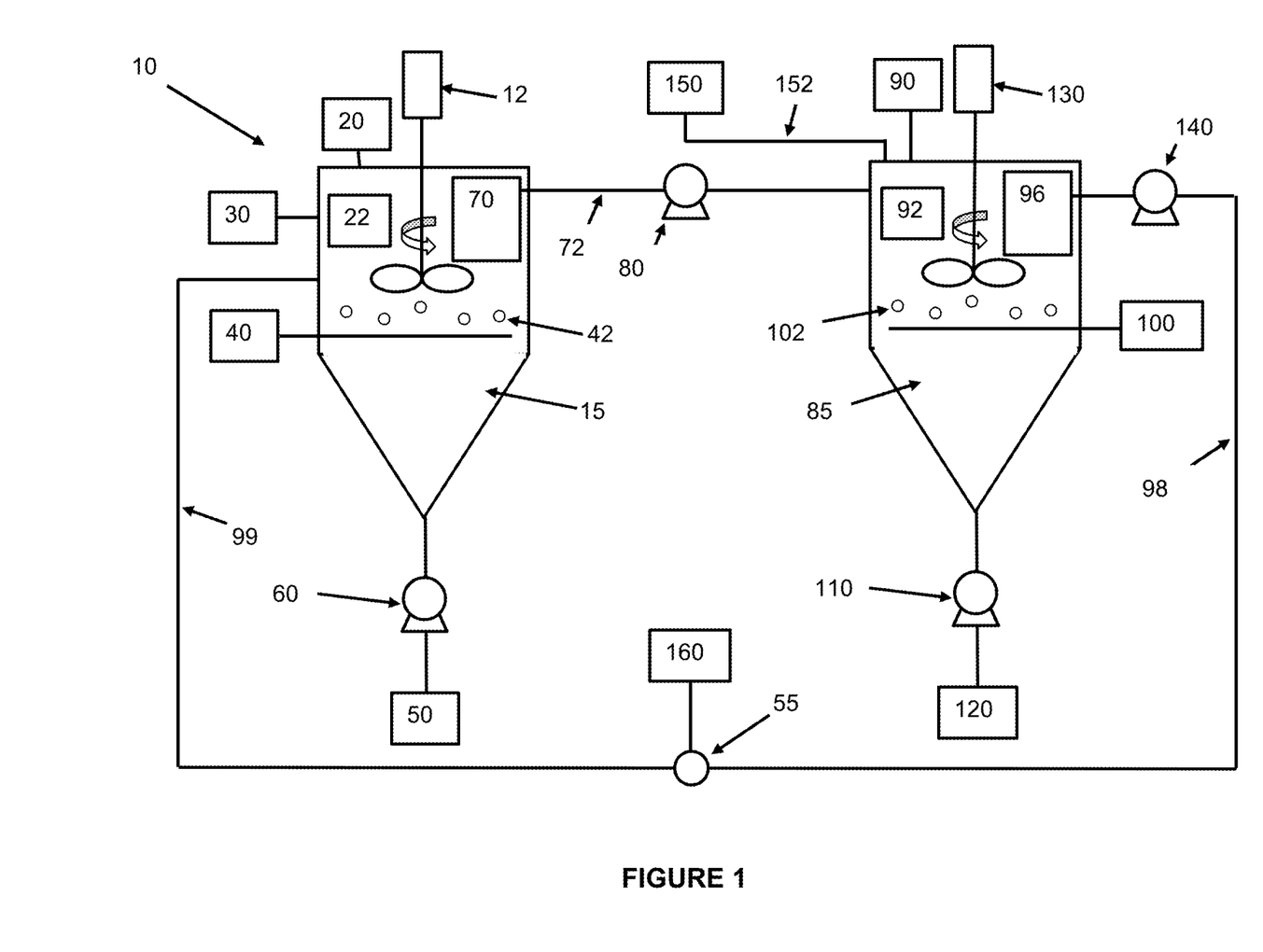
FIG. 1 illustrates a schematic of the PEARS system.

In the first aspect, the PEARS system (10) is described, a generic schematic of which is shown in FIG. 1. In the system, the acidification reactions occur in Reactor #1 (15) and the precipitation of nutrient-rich minerals occurs in Reactor #2 (85). The system can be controlled using a supervisory control and data acquisition (SCADA) system or equivalent thereof (not shown). A SCADA device is a computer-based system that monitors and controls industrial, infrastructure and facility-based processes. The reactors (15, 85) can be lab-scaled or industrial-scaled in size.

Manure slurries are prepared or delivered to basin (30) for delivery to reactor #1 (15). A pump may be needed to move the manure slurry from the basin (30) to reactor #1 (15). The size of basin (30) can vary based on the size of the reactors (15, 85). The manure slurry can have a concentration of from about 10 g/L to about 1000 g/L, preferably about 50 g/L to about 250 g/L, and even more preferably about 100 g/L to about 200 g/L. In reactor #1 (15), the manure slurry is acidified. The acidification step is achieved by dosing the manure slurry with acid from container (20), and optionally bubbling the slurry with $CO_2$ enriched gas (40), into the reactor #1 until the pH reaches a set point of about 4.5 to about 5.5, preferably about 4.8 to about 5.2. In a preferred embodiment, the acidification step is achieved by dosing the manure slurry with acid and bubbling the slurry with $CO_2$ enriched gas. This process can be controlled through the SCADA system, or equivalent thereof, with continuous monitoring of the solution pH. Although not wishing to be bound by a particular acid, the acid can be selected from the group consisting of hydrochloric acid, sulfuric acid, and combinations thereof, preferably hydrochloric acid. Advantageously, bubbling the slurry with $CO_2$ enriched gas not only reduces the strong acid demand, thus reducing operating costs, but also agitates the system, resulting in smaller particle sizes and faster nutrient release kinetics. When $CO_2(g)$ bubbling is used, it is introduced into the reactor #1 (15) using a diffuser (44) (e.g., stone or membrane) (the bubbles are depicted by (42)). The pH can be continually monitored using a pH meter or multi-parameter meter (22), which can be interfaced with the SCADA system or equivalent thereof. When the pH reaches a range of about 5.5 to about 6.5, preferably about 5.9 to about 6.1, an external pump begins dosing HCl from container (20) until the set point of about 4.5 to about 5.5, preferably about 4.8 to about 5.2. The contents in the reactor #1 (15) are continuously mixed using a mixer, preferably using an overhead mixer (12) or a paddle-type mixer, to further decrease particle size of the manure and instigate nutrient release. The required contact time for optimal nutrient release from the manure in the slurry is in a range from about 10 minutes to about 200 minutes, preferably about 20 minutes to about 35 minutes, and can be conducted in continuous flow or sequencing batch mode. Nutrient-rich solution is collected from the permeate side of a membrane module (70) (e.g., polymer or ceramic) and pumped via conduit (72) into Reactor #2 (85) for recovery processing. Nutrient-deficient solids are collected from the reactor #1 (15) in container (50). Advantageously, the bubbling unit (40, 44) also facilitates scouring of membrane modules (70) used for solid-liquid separation. Notably, the membrane module (70) is submerged in the slurry in the reactor (15).

Struvite precipitation occurs in Reactor #2 (85) by increasing the pH to a range of about 8 to about 10, preferably about 8.5 to about 9.2. The precipitation step is achieved by dosing the liquid, which includes the nutrient-rich solution collected from the permeate side of a membrane module (70) in reactor #1 (15), with base from container (90), and optionally bubbling with air (100), into the reactor #2 until the pH reaches a set point of about 8 to about 10, preferably about 8.5 to about 9.2. In a preferred embodiment, the precipitation step is achieved by dosing the liquid with base and bubbling with air. Although not wishing to be bound by a particular base, the base can be selected from the group consisting of sodium hydroxide, potassium hydroxide, magnesium hydroxide, and combinations thereof, preferably sodium hydroxide. As in Reactor #1, this process can be controlled through the SCADA system, or equivalent thereof, and continuous monitoring of the solution pH. Using the system, concentrated base from container (90) can be dosed into Reactor #2 (85) until the pH approaches about 7.0; below this pH, rapid overhead mixing occurs to facilitate uniform conditions within the reactor. Above pH 7.0, air (102) can be sparged into the reactor through a diffuser (104) (e.g., stone or membrane) with continued NaOH addition until the pH setpoint (i.e., about 8 to about 10, preferably about 8.5 to about 9.2) is attained. The pH can be continually monitored using a pH meter or multi-parameter meter (92), which can be interfaced with the SCADA system or equivalent thereof. Advantageously, air sparging facilitates growth of struvite particles, which benefits physical recovery and separation of the recovered products, and strips excess $CO_2$ from the system, increasing the pH of the liquid in reactor #2 (85). During this precipitation process, gentle mixing conditions using a mixer, e.g., an overhead mixer (130) or a paddle-type mixer, can be employed to facilitate particle growth without causing attrition. Precipitation occurs rapidly once the setpoint is reached and contact time in a range of about 5 minutes to about 60 minutes, preferably about 10 minutes to about 30 minutes, facilitates substantial precipitation. Nutrient-laden struvite solids are collected in container (120) from reactor #2 (85). Low-phosphorus, but nitrogen- and potassium-rich effluent, can be recycled through the permeate side of a membrane module (96). The recycled permeate from the membrane module can be directed via conduit (98) to switch (55), where it can be collected in container (160), or can be sent to Reactor #1 (15) via conduit (99) as the makeup water for the next stage of recovery. The air bubbling unit (100, 104) scours the membrane module (96) (e.g., polymer or ceramic) used for solid-liquid separation. Advantageously, up to ten stages of recycle can be employed without a drop in overall phosphorus recovery. Pumps (60, 80, 110, and 140) are positioned throughout the system to move liquids and/or solids from vessel to vessel. Notably, the membrane module (96) is submerged in the liquid in the reactor (85).

As noted, several components of the system can be in communication with the SCADA system or equivalent thereof. For example, at least one of the multi-parameter meters (22, 92), the mixers (12, 130), the containers (20, 90), and the pumps (60, 80, 110, and 140) can be in communication with the SCADA system, or equivalent thereof. Preferably, both multi-parameter meters (22, 92), both mixers (12, 130), both containers (20, 90), and all the pumps (60, 80, 110, and 140) are in communication with the SCADA system, or equivalent thereof.

Potential for further treatment and resource recovery includes, but is not limited to, ammonia scrubbing and manure-to-energy (not shown). In the case of ammonia scrubbing, the air (102) sparging during precipitation in reactor #2 (85) allows for the separate recovery of ammonia from a vent at the top of the reactor, said vent leading to the scrubber (150). With regards to manure-to-energy, this can be positioned along conduit (98) between the pump (140) and switch (55).

In one embodiment, the phosphorus extraction and recovery system (PEARS) comprises an acidification reactor and a precipitation reactor, which are in liquid communication with one another. Both reactors can include at least a mixer and a membrane module. A manure slurry can be delivered to the acidification reactor. An acid can be delivered to the acidification reactor for combination with the manure slurry. Following acidification, the acidic liquid comprising valuable nutrients can be separated from the solids using the membrane module and said acidic liquid can be directed to the precipitation reactor. A base can be delivered to the precipitation reactor for combination with the acidic liquid so that struvite and/or potassium struvite precipitation occurs. A membrane module in the precipitation reactor can be used to separate the solids (struvite and/or potassium struvite) from the now basic liquid.

In one embodiment, the phosphorus extraction and recovery system (PEARS) comprises:

(a) an acidification reactor, wherein the acidification reactor comprises a first multi-parameter meter, first mixer, and a first membrane module;

(b) a first container in liquid communication with the acidification reactor, wherein the first container is fabricated of material that is inert to an acidic solution;

(c) a basin in liquid communication with the acidification reactor, wherein the basin is fabricated of material that is inert to a manure slurry;

(d) a second container in communication with the acidification reactor, wherein the second container is positioned so that solids that are present in the acidification reactor can be accumulated;

(e) a precipitation reactor in liquid communication with the first membrane module of the acidification reactor, wherein the precipitation reactor comprises a second multi-parameter meter, second mixer, and a second membrane module;

(f) a third container in liquid communication with the precipitation reactor, wherein the third container is fabricated of material that is inert to a basic solution;

(g) a fourth container in communication with the precipitation reactor, wherein the fourth container is positioned so that solids precipitated in the precipitation reactor can be accumulated; and (h) a fifth container in communication with the second membrane module, wherein the fifth container is fabricated of material that is inert to liquid fertilizer.

In another embodiment, the phosphorus extraction and recovery system (PEARS) comprises:

(a) an acidification reactor, wherein the acidification reactor comprises a first multi-parameter meter, first mixer, and a first membrane module;
(b) a first container in liquid communication with the acidification reactor, wherein the first container is fabricated of material that is inert to an acidic solution;
(c) a basin in liquid communication with the acidification reactor, wherein the basin is fabricated of material that is inert to a manure slurry;
(d) a second container in communication with the acidification reactor, wherein the second container is positioned so that solids that are present in the acidification reactor can be accumulated;
(e) a precipitation reactor in liquid communication with the first membrane module of the acidification reactor, wherein the precipitation reactor comprises a second multi-parameter meter, second mixer, and a second membrane module;
(f) a third container in liquid communication with the precipitation reactor, wherein the third container is fabricated of material that is inert to a basic solution;
(g) a fourth container in communication with the precipitation reactor, wherein the fourth container is positioned so that solids precipitated in the precipitation reactor can be accumulated; and
(h) a fifth container in communication with the second membrane module, wherein the fifth container is fabricated of material that is inert to liquid fertilizer, wherein the PEARS system further comprises at least one of:
(i) a carbon dioxide bubbler in gaseous communication with the acidification reactor;
(ii) an air bubbler in gaseous communication with the precipitation reactor;
(iii) at least one pump positioned between the first membrane module and the precipitation reactor;
(iv) at least one pump positioned downstream of the second membrane module;
(v) a switch positioned downstream of the second membrane module, wherein the switch directs solution from the second membrane module to either the fifth container, the acidification reactor, or both;
(vi) at least one pump positioned between the acidification reactor and the second container;
(vii) at least one pump positioned between the precipitation reactor and the fourth container;
(viii) an ammonia scrubbing module in gaseous communication with the precipitation reactor; and
(ix) a manure-to-energy module positioned downstream of the second membrane module.

In still another embodiment, the phosphorus extraction and recovery system (PEARS) comprises:
(a) an acidification reactor, wherein the acidification reactor comprises a first multi-parameter meter, first mixer, a first membrane module, and a carbon dioxide bubbler in gaseous communication with the acidification reactor;
(b) a first container in liquid communication with the acidification reactor, wherein the first container is fabricated of material that is inert to an acidic solution;
(c) a basin in liquid communication with the acidification reactor, wherein the basin is fabricated of material that is inert to a manure slurry;
(d) a second container in communication with the acidification reactor, wherein the second container is positioned so that solids that are present in the acidification reactor can be accumulated;
(e) a precipitation reactor in liquid communication with the first membrane module of the acidification reactor, wherein the precipitation reactor comprises a second multi-parameter meter, second mixer, a second membrane module, and an air bubbler in gaseous communication with the precipitation reactor;
(f) a third container in liquid communication with the precipitation reactor, wherein the third container is fabricated of material that is inert to a basic solution;
(g) a fourth container in communication with the precipitation reactor, wherein the fourth container is positioned so that solids precipitated in the precipitation reactor can be accumulated; and
(h) a fifth container in communication with the second membrane module, wherein the fifth container is fabricated of material that is inert to liquid fertilizer, further comprising (i) at least one pump positioned between the first membrane module and the precipitation reactor, (ii) at least one pump positioned downstream of the second membrane module, a switch positioned downstream of the second membrane module, wherein the switch directs solution from the second membrane module to either the fifth container, the acidification reactor, or both, (iii) at least one pump positioned between the acidification reactor and the second container, and (iv) at least one pump positioned between the precipitation reactor and the fourth container.

In a second aspect, a process for treating manure in order to isolate a target precipitate is described, the process comprising:
(a) providing a manure slurry;
(b) introducing the manure slurry into an acidification reactor, wherein the pH of the manure slurry is lowered to a range of about 4.5 to about 5.5 using at least one acid, wherein the manure slurry is mixed in the acidification reactor to instigate nutrient release;
(c) collecting nutrient-deficient solids from the acidification reactor;
(d) collecting nutrient-rich permeate in a first membrane module which is positioned in the acidification reactor, and moving the nutrient-rich solution to a precipitation reactor;
(e) initiating precipitation of the target precipitate in the precipitation reactor by raising the pH of the nutrient-rich permeate to a range of about 8.5 to about 9.2 using at least one base;
(f) collecting the target precipitate from the precipitation reactor; and
(g) collecting effluent from a second membrane module which is positioned in the precipitation reactor. Preferably, the target precipitate comprises struvite and/or potassium struvite. Additionally, preferably, no additional chemicals, other than the at least one acid and at least one base are added to the process.

In an embodiment, the process for treating manure in order to isolate a target precipitate comprises:
(a) providing a manure slurry;
(b) introducing the manure slurry into an acidification reactor, wherein the pH of the manure slurry is lowered to a range of about 4.5 to about 5.5 using at least one acid, wherein the manure slurry is mixed in the acidification reactor to instigate nutrient release;
(c) collecting nutrient-deficient solids from the acidification reactor;
(d) collecting nutrient-rich permeate in a first membrane module which is positioned in the acidification reactor, and moving the nutrient-rich solution to a precipitation reactor;

(e) initiating precipitation of the target precipitate in the precipitation reactor by raising the pH of the nutrient-rich permeate to a range of about 8.5 to about 9.2 using at least one base;
(f) collecting the target precipitate from the precipitation reactor; and
(g) collecting effluent from a second membrane module which is positioned in the precipitation reactor, wherein the process further comprises at least one of:
(i) bubbling the manure slurry in the acidification reactor with $CO_2$-enriched gas;
(ii) sparging the nutrient-rich permeate in the precipitation reactor with air;
(iii) pumping the nutrient-rich permeate from the first membrane module in the acidification reactor to the precipitation reactor;
(iv) pumping effluent from the second membrane module;
(v) directing effluent from the second membrane module to the acidification reactor to be used as makeup water;
(vi) pumping the nutrient-deficient solids from the acidification reactor;
(vii) pumping the target precipitate from the precipitation reactor; and
(viii) recovering the ammonia from the precipitation reactor using an ammonia scrubber.
Preferably, the target precipitate comprises struvite and/or potassium struvite. Additionally, preferably, no additional chemicals, other than the at least one acid and at least one base are added to the process.

In an embodiment, the process for treating manure in order to isolate a target precipitate comprises:
(a) providing a manure slurry;
(b) introducing the manure slurry into an acidification reactor, wherein the pH of the manure slurry is lowered to a range of about 4.5 to about 5.5 using at least one acid, wherein the manure slurry is mixed in the acidification reactor to instigate nutrient release;
(c) collecting nutrient-deficient solids from the acidification reactor;
(d) collecting nutrient-rich permeate in a first membrane module which is positioned in the acidification reactor, and moving the nutrient-rich solution to a precipitation reactor;
(e) initiating precipitation of the target precipitate in the precipitation reactor by raising the pH of the nutrient-rich permeate to a range of about 8.5 to about 9.2 using at least one base;
(f) collecting the target precipitate from the precipitation reactor; and
(g) collecting effluent from a second membrane module which is positioned in the precipitation reactor, wherein the process further comprises:
(i) bubbling the manure slurry in the acidification reactor with $CO_2$-enriched gas;
(ii) sparging the nutrient-rich permeate in the precipitation reactor with air;
(iii) pumping the nutrient-rich permeate from the first membrane module in the acidification reactor to the precipitation reactor;
(iv) pumping effluent from the second membrane module;
(v) directing effluent from the second membrane module to the acidification reactor to be used as makeup water;
(vi) pumping the nutrient-deficient solids from the acidification reactor; and
(vii) pumping the target precipitate from the precipitation reactor.
Preferably, the target precipitate comprises struvite and/or potassium struvite. Additionally, preferably, no additional chemicals, other than the at least one acid and at least one base are added to the process.

Advantageously, the PEARS system and process is capable of (i) retaining manure solids using the membrane modules, wherein the membrane modules extract nutrients and residual solids as a low-nutrient manure and reduce volatile organic carbon content due to the bubbling process, (ii) lowering the acid demand associated with nutrient release by bubbling $CO_2$-containing gas into the manure slurry, (iii) lowering the base demand associated with struvite precipitation by bubbling air to release dissolved $CO_2$, (iv) increasing the size/growth of struvite particles by gas bubbling, (v) separately recovering ammonia gas using air sparging during struvite precipitation, (vi) struvite and potassium struvite are produced from poultry litter extracts without additional/external chemical addition (e.g., $Mg^{2+}$, $NH_4^+$, $K^+$, $Ca^{2+}$), (vii) recycling the process effluent over at least 10 stages, (viii) increasing phosphorus recovery in the form of struvite minerals, (ix) decreasing water consumption, and (x) generating a high-strength liquid fertilizer with a high $NH_4^+$ and $K^+$ content.

The precipitated nutrient-rich minerals can be utilized as a slow release fertilizer as either as a specialty fertilizer in plant nurseries or blended into main agricultural fertilizers. Notably, even when applied at relatively high application rates, struvite can act as a slow release fertilizer without damaging plant roots and leaching potential is low. The process can be controlled to generate predominantly struvite or potassium struvite.

Livestock manure, besides containing a mixture of feces and urine, may also include wasted feed, bedding and water (including, but not limited to, spilled water, flush water, wash water, and precipitation). Manure characteristics are generally affected by diet, species and the growth stage of the animals, and the manure collection method used, including the amount of water added to dilute the waste. Typically, animal manure is about 80% to about 95% liquid by weight due to urine, sloppy drinking, animal washing and flush water. As such, the manure slurry may be pretreated to remove any unwanted material, larger solids and excess liquids from the manure medium before introduction into the PEARS system described herein, wherein the pretreating includes systems such as a screw press, centrifuge, vibrating screen, mesh screening, belt filter, hydrocyclone and other systems that may further reduce particle size, and/or remove unwanted large material to ensure easy flow into and through the PEARS system.

Further, the manure may be pretreated in an anaerobic digester, which includes holding manure in an air-tight tank that is heated to about 100 degrees Fahrenheit. Bacteria in the manure thrive in these conditions and they consume solids in the manure while releasing methane gas. Naturally occurring bacteria will degrade the volatile solids, releasing a combination of carbon dioxide ($CO_2$) and methane ($CH_4$) that may be burned/combusted for energy production. Further, the $CO_2$ can be collected for use in the PEARS system in the acidification reactor (when used). Digestion does not reduce the nutrients in the manure, although it may alter the form of the nitrogen (more ammonia) and phosphorus (more orthophosphate).

The features and advantages of the invention are more fully illustrated by the following non-limiting examples, wherein all parts and percentages are by weight, unless otherwise expressly stated.

Example 1

Baseline measurements of general properties of seven poultry litter samples are shown in Table 1. These properties include moisture content, total organic carbon (TOC), the UV absorbance at 254 nm (for a filtered, 40 g/L slurry), and the pH of a filtered 40 g/L slurry. Fluorescence excitationemission matrices (EEMs) for the seven poultry litters were also recorded, along with photographs of each litter. The differences in EEM response may be the result of poultry feed and litter age, wherein CHF, RCG, and RCP are conventional farms, FRF-0.5 and FRF-1.0 are organic farms, and ELG and ELN are poultry litter aggregators. The organic matter composition, indicated by the EEM response, provides insight into two major pieces of information: (1) the acid/base demand of poultry litter slurries and (2) the extent of metal (e.g., $Mg^{2+}$) complexation that can be expected by dissolved organic matter (DOM). The acid/base demand of poultry litter organic matter affects the process economics. Organic matter complexation of $Mg^{2+}$ reduces the free magnesium concentration and inhibits struvite formation. From the EEMs, RCG and ELG are expected to have the least and greatest organic matter impact (and hence the most and least non-complexed $Mg^{2+}$), respectively, consistent with the TOC content.

TABLE 1

Baseline properties of poultry litter collected from different samples.

| Property | CHF | ELG | ELN | FRF-0.5 | FRF-1.0 | RCG | RCP |
|---|---|---|---|---|---|---|---|
| $H_2O$ (%) | 31.5 | 31.2 | 26.4 | 45.7 | 19.0 | 25.3 | 26.5 |
| TOC (%) | 31.8 | 33.3 | 32.6 | 32.6 | 29.3 | 24.5 | 25.5 |
| $UV_{254}$ ($cm^{-1}$) | 2.38 | 2.51 | 2.08 | 1.40 | 3.03 | 3.45 | 3.81 |
| pH | 8.34 | 8.74 | 8.49 | 7.79 | 8.90 | 7.86 | 7.60 |

The following anions/cations were then measured in the seven poultry litter slurries: $Cl^-$, $NO_3^-$, $PO_4^{3-}$, $SO_4^{2-}$, $Na^+$, $NH_4^+$, $K^+$, $Mg^{2+}$, and $Ca^{2+}$. The molar concentrations of these inorganic species in poultry litter slurries (40 g/L poultry litter) are shown in Table 2.

TABLE 2

Molar concentrations (mol/L) of typical anions/cations present in seven different poultry litters.

| Species | CHF | ELG | ELN | FRF-0.5 | FRF-1.0 | RCG | RCP |
|---|---|---|---|---|---|---|---|
| $Cl^-$ | 7.95E−02 | 7.79E−02 | 7.32E−02 | 8.22E−02 | 8.79E−02 | 7.56E−02 | 7.25E−02 |
| $NO^{3-}$ | 4.21E−04 | 3.35E−05 | 9.84E−05 | 3.79E−05 | 6.52E−05 | 3.13E−04 | 1.06E−04 |
| $PO_4^{3-}$ | 7.03E−03 | 7.95E−03 | 8.92E−03 | 6.57E−03 | 1.00E−02 | 1.04E−02 | 9.21E−03 |
| $SO_4^{2-}$ | 3.69E−03 | 6.84E−03 | 1.22E−02 | 6.18E−03 | 4.22E−03 | 9.74E−03 | 8.24E−03 |
| $Na^+$ | 7.50E−03 | 1.48E−02 | 1.55E−02 | 7.18E−03 | 7.47E−03 | 1.07E−02 | 9.71E−03 |
| $NH_4^+$ | 1.81E−02 | 2.53E−02 | 1.17E−02 | 1.24E−02 | 1.54E−02 | 2.49E−02 | 2.33E−02 |
| $K^+$ | 2.40E−02 | 2.43E−02 | 2.91E−02 | 3.10E−02 | 3.18E−02 | 2.95E−02 | 2.68E−02 |
| $Mg^{2+}$ | 7.69E−03 | 7.05E−03 | 7.88E−03 | 8.29E−03 | 8.70E−03 | 9.57E−03 | 8.28E−03 |
| $Ca^{2+}$ | 1.04E−02 | 8.41E−03 | 1.16E−02 | 1.09E−02 | 1.25E−02 | 6.81E−03 | 5.61E−03 |

As can be seen, consistent with Table 1, the higher the TOC content, the lower the concentration of $Mg^{2+}$.

The compositions of the distinct poultry litter samples were used to model the inorganic speciation and solid-liquid equilibrium of individual poultry litter slurries. The resulting inorganic chemistry analyses were modeled using the MINEQL+ software, with a focus first on the phosphorus system. In this case, the precipitation of struvite and potassium was focused on due to the relatively high concentrations of phosphorus (P(V)), ammonium ($NH_4^+$), magnesium ($Mg^{2+}$), and potassium ($K^+$) present in the poultry litter samples. The minimum achievable phosphorus concentration, which is coincidental with maximum phosphorus recovery, occurs around pH 9.0.

With regards to ammonia, greater recovery of ammonia is advantageous. For example, $NH_4^+$ incorporation into struvite was found to have a minimal impact on the total ammonia present in the poultry litter slurry, indicating an additional need for nitrogen treatment/recovery. The PEARS system and process described herein directly addresses this challenge in two ways: (i) ammonia degassing and recovery, and (ii) production of a high-strength liquid fertilizer containing $K^+$ and $NH_4^+$.

To demonstrate the potential for struvite precipitation from poultry litter extracts, consider the molar ratios documented in Table 3 for all seven poultry litter samples. For the majority of litter samples, the total phosphate concentration is similar to or less than the total magnesium concentration, indicating that phosphorus is limiting. This scenario is ideal as it ensures high phosphorus recovery during the precipitation step. Furthermore, this data indicates that struvite recovery, without additional chemical inputs, is feasible. The presence of additional calcium (see, Table 2) may result in a calcium-phosphate co-precipitate, however, the molar ratio of calcium to phosphorus is not sufficient to cause hydroxyapatite precipitation (i.e., 5 mol $Ca^{2+}$ required for 3 mol $PO_4^{3-}$). While the inorganic modeling technique used herein informs the chemical composition of recovered phosphorus, the actual chemical makeup of recovered phosphorus products can be rigorously identified using scanning electron microscopy (SEM) with energy dispersive x-ray spectroscopy (EDX).

TABLE 3

Molar ratios for struvite and potassium struvite for the seven poultry litters. All ratios are normalized to phosphorus; note that ammonium and potassium are abundant in all litter samples, whereas magnesium concentrations are at the required stoichiometric ratio.

| Molar ratio | CHF | ELG | ELN | FRF-0.5 | FRF-1.0 | RCG | RCP |
|---|---|---|---|---|---|---|---|
| $Mg:NH_4:PO_4$ | 1.1:2.6:1 | 0.9:3.2:1 | 0.9:1.3:1 | 1.3:19:1 | 0.9:1.5:1 | 0.9:2.4:1 | 0.9:2.5:1 |
| $Mg:K:PO_4$ | 1.1:34:1 | 0.9:3.1:1 | 0.9:3.3:1 | 1.3:4.7:1 | 0.9:3.2:1 | 0.9:2.8:1 | 0.9:2.9:1 |

Example 2

Figure 2A:
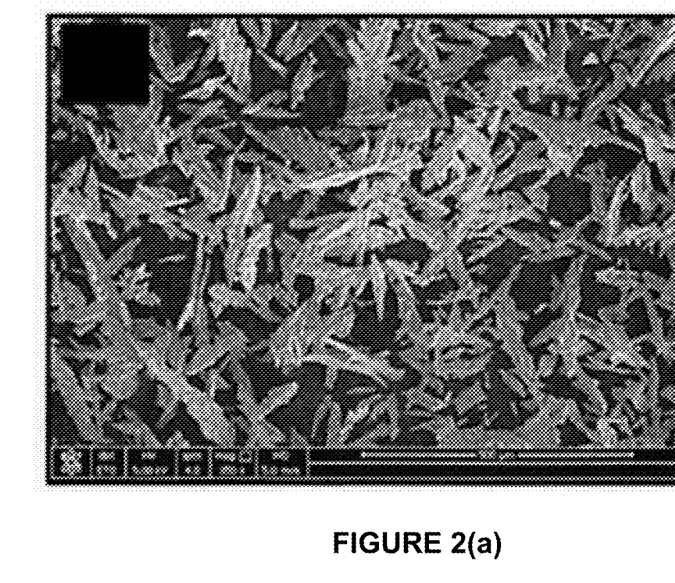
FIG. 2(a) is an SEM micrograph of standard struvite.
Figure 2B:
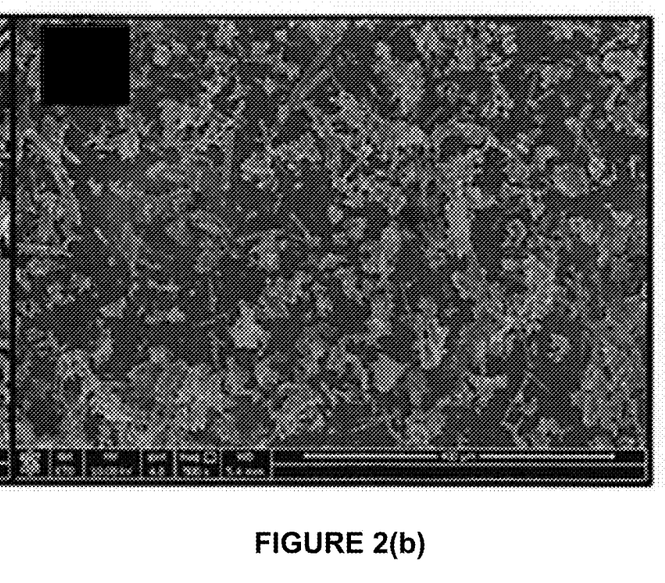
FIG. 2(b) is an SEM micrograph of standard potassium struvite.

As indicated above, the poultry litter slurries investigated in this study have a chemical composition that shows potential for direct struvite precipitation without additional chemical inputs like $MgCl_2$ or $NH_4Cl$. To demonstrate production of struvite and potassium struvite, struvite (Rxn. 1) and potassium struvite (Rxn. 2) standards were produced in synthetic solutions using the equilibrium relationships shown in Eq. 1 and Eq. 2, respectively. The resulting precipitates were oven-dried overnight, and then freeze-dried before SEM/EDX analysis. The SEM images for the struvite and potassium struvite standards are shown in FIGS. 2(a) and 2(b), respectively. Elemental analysis of the standard precipitates demonstrated the following Mg:P molar ratios: 0.8:1.0 (struvite); 1.1:1.0 (potassium struvite). This composition conforms to the expected molar ratios, although some variation from the hypothetical stoichiometry exists, presumably due to surface phenomena.

$$NH_4MgPO_4 \cdot 6H_2O(s) \leftrightharpoons NH_4^+ + Mg^{2+} + PO_4^{3-} + 6H_2O \qquad \text{Rxn. 1}$$

$$K_{sp,NH_4MgPO_4 \cdot 6H_2O} = 10^{-13.3} = [NH_4^+][Mg^{2+}][PO_4^{3-}] \qquad \text{Eq. 1}$$

$$KMgPO_4 \cdot 6H_2O(s) \leftrightharpoons K^+ + Mg^{2+} + PO_4^{3-} + 6H_2O \qquad \text{Rxn. 2}$$

$$K_{sp,KMgPO_4 \cdot 6H_2O} = 10^{-10.6} = [K^+][Mg^{2+}][PO_4^{3-}] \qquad \text{Eq. 2}$$

Preliminary struvite precipitation experiments were conducted by adding sodium hydroxide (NaOH) to membrane-filtered poultry litter slurries (pH 4.4) until the pH reached 8.8. To further increase the precipitation potential, and decrease the effective water consumption, tests were conducted at various solid-to-liquid loadings. In particular, phosphorus release and recovery for poultry litter slurries at 40-200 g/L were examined. It was determined that the acid demand of nutrient release is linear with poultry litter dose. Therefore, high poultry litter loading can be used without disproportionately increasing the acid demand. Above 200 g/L, the mixing efficiency decreased, raising kinetic concerns. These findings are important because high solids poultry litter slurries extract more nutrients into a specific volume of water, thereby reducing the amount of water needed for the process and increasing the effective concentration of nutrients in the aqueous phase. At higher aqueous concentrations, the potential for struvite and potassium struvite precipitation increases according to Eq. 1-2. Similar linear trends were observed for the corresponding base demand.

Figure 3A:
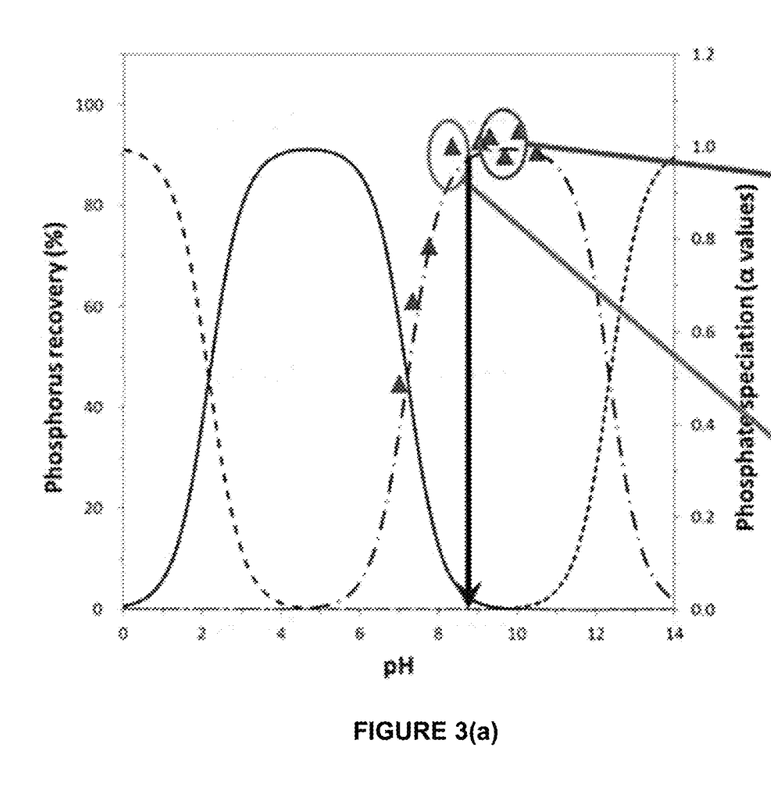
FIG. 3(a) illustrates phosphorus recovery and phosphate precipitation as a function of pH.

Struvite precipitation was observed at pH as low as 7.0; however, optimal phosphorus recovery occurred at pH 9.0 as shown in FIG. 3(a). As indicated above, the recovery pH was adjusted through NaOH addition. With this strategy, the nutrient recovery process can employ strong acid (e.g., HCl) and strong base (e.g., NaOH); therefore, the effective chemical addition is in the form of NaCl. Other nutrient recovery systems require additional chemical inputs, such as $Ca^{2+}$, $Mg^{2+}$, and even $NH_4^+$, which somewhat defeats the purpose of recovering nutrients. For example, previous researchers have employed magnesium, ammonium, potassium, and calcium based salts/hydroxides to force precipitation of nutrient-laden solids, such as hydroxyapatite or struvite. A major benefit of PEARS is that all necessary chemicals for nutrient recovery stem from the raw material, i.e., poultry litter. In other words, no additional chemicals are needed in the PEARS system or method, other than an acid and a base as described, although it is contemplated that additional chemicals may be added, as readily determined by the person skilled in the art.

Phosphorus recovery data from our simplified process (i.e., HCl release, followed by NaOH precipitation) is plotted as a function of pH in FIG. 3(a). As shown in FIG. 3(a), greater than 90% phosphorus recovery was observed at pH 8.8-9.2.

Figure 3B:
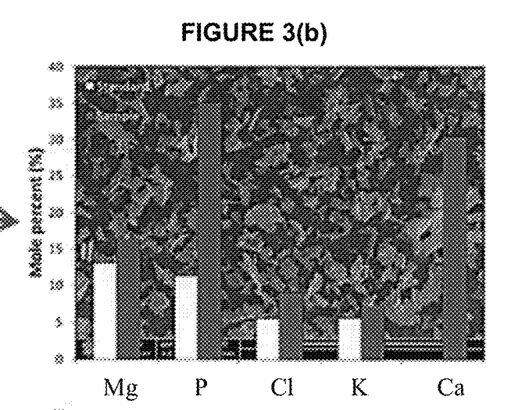
FIG. 3(b) is an SEM micrograph and EDX elemental analysis for the higher recovery pH of FIG. 3(a).
Figure 3C:
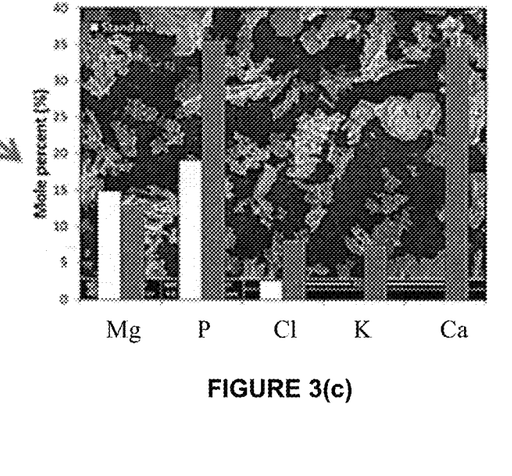
FIG. 3(c) is an SEM micrograph and EDX elemental analysis for the lower recovery pH of FIG. 3(a).

The SEM images with EDX elemental analysis in FIGS. 3(b) and 3(c) provide insight into the chemical composition of recovered products. Firstly, the morphology of the recovered products align with that shown in FIGS. 2(a) and 2(b) for standard struvite and potassium struvite products, respectively, although the struvite crystals demonstrate some co-precipitate that increases the surface area of the needle-like structures. Elemental analysis demonstrates that potassium struvite was preferred at high pH, which is expected due to ammonium-ammonia speciation ($pK_a$=9.25) near pH 9. The overall elemental analysis of recovered products was quite similar to the potassium struvite standard; however, a fraction of the recovered P appears to be bound in a calcium-containing co-precipitate. The relatively low recovery pH suggests a potential for recycling of the process effluent. Such a scenario would provide other benefits, such as increasing magnesium, ammonium, and potassium concentrations in subsequent process stages, while also minimizing phosphorus concentrations in the final effluent.

Figure 4A:
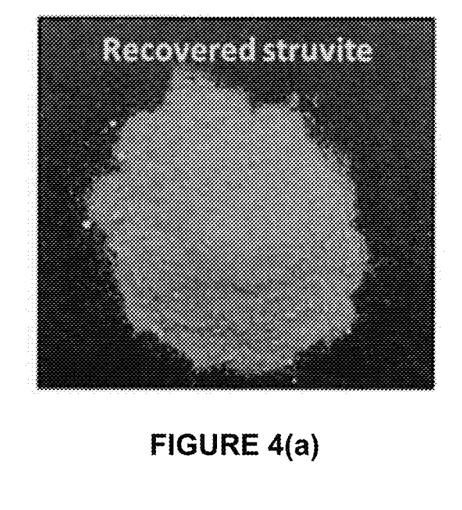
FIG. 4(a) is a photograph of ready-to-use homogenized struvite product.
Figure 4B:
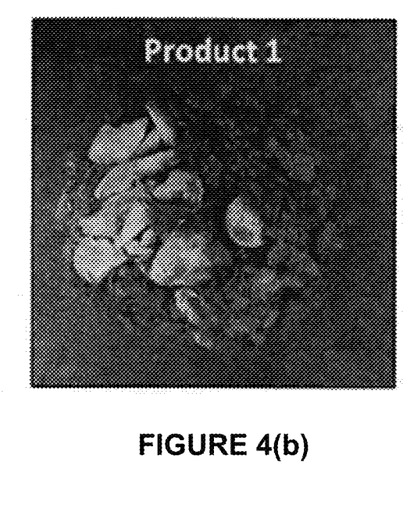
FIG. 4(b) is a photograph of product 1 having large pebble-like particles (light color, struvite) and small soil-like particles (dark color).
Figure 4C:
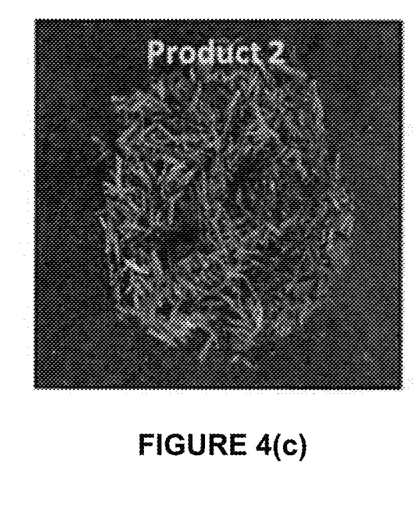
FIG. 4(c) is a photograph of product 2 with needle-like crystals (light color, struvite) and small soil-like particles (dark color).

The chemistry of recovered products was further investigated using the PEARS system and process, wherein gas bubbling was incorporated in the phosphorus extraction and recovery system. Photographs of recovered struvite products are shown in FIGS. 4(a-c). FIG. 4(a) is a ready-to-use struvite fertilizer. The FIG. 4(b) pebble- and FIG. 4(c) needle-like structures show a crystalline structure and elemental composition identical to struvite. The pebble- and needle-like minerals were generated using different gas bubbling techniques in the PEARS system. The brownish coloring comes from organic matter incorporation (approximately 5-10%). The small soil-like particles (Type 2) mixed with the lighter Type 1 particles in both products show a more heterogeneous composition with calcium, magnesium, and phosphorus content. It may be possible that the morphological differences between these two products facilitates separation (e.g., sieving) to generate two different purities of recovered fertilizers, wherein the Type 1 product is high quality with Mg, P, and K content, and the Type 2 fertilizer contains calcium, magnesium, phosphorus, potassium, and organic carbon.

Example 3

As indicated in Example 2, the results demonstrated that at high solids loading (e.g., up to 200 g/L), water consumption is effectively lowered. However, because poultry litter is a dry waste product, further reductions in the volume of process effluent would be advantageous from a waste management perspective. With the PEARS system, the recovery pH is relatively low; therefore, a potential for reusing effluent in subsequent process stages exists. The pH of some poultry litter slurries (before acid addition) was 8.0-9.0, as indicated in Table 1; hence, the acid demand required for dropping the pH of the process effluent (e.g., the effluent from the second membrane module that can be directed to the acidification reactor to be used as makeup water) should not be much higher than a "clean" solution (i.e., manure plus water). Another benefit from reusing process effluent is that magnesium, ammonium, potassium, and even phosphorus in the effluent remain in the system and force the precipitation reactions to the right, thereby increasing the tendency for struvite and potassium struvite to precipitate. In other words, in an n-stage experiment, no new liquid additions are necessary. Instead the effluent is reused n times. With each stage, the dissolved organic matter (DOM) content, nonreactive electrolytes (e.g., $Na^+$, $Cl^-$), and excess nutrients (i.e., $Mg^{2+}$, $K^+$, $NH_4^+$, $PO_4^{3-}$) get concentrated. This concentration effect helps retain excess nutrients and increase precipitation efficiencies in later stages.

Results from the 5-stage and 10-stage experiments demonstrated high phosphorus recovery (>80%). In both cases, phosphorus release was conducted at pH 4.4 using HCl addition and phosphorus recovery occurred through NaOH addition (to pH 8.8). A slight upward trend in overall phosphorus recovery was observed from stage 1 to stage 4, which was expected from the buildup of ions through the process; however, in the 10-stage experiment, recovery dipped back into the 85-90% range for stages 5-10. Note that the overall phosphorus recovery efficiency was 80-97% for all stages. However, the precipitation efficiency was greater than 95% for most stages. These results suggest that the release step (i.e., acidification) limited overall recovery, possibly due to incomplete release of magnesium or DOM complexation of $Mg^{2+}$, as hypothesized above.

As introduced hereinabove, the volume associated with acid can be decreased significantly by using gas-based acids, such as $CO_2(g)$ streams. The excess $CO_2$ can be stripped out of solution using air during the precipitation step. Replacing the strong acid with $CO_2(g)$ streams will also reduce the cost associated with nutrient extraction.

Notably, the DOM content in the effluent increased during the 10-stage experiment. As solutions contain more DOM, a significant potential exists for DOM-$Mg^{2+}$ complexation, thus preventing precipitation of struvite-based minerals. Regardless, no significant impacts on phosphorus recovery were observed in these experiments. Further, the increasing strength of the process effluent may also increase the value of this stream to be used as a liquid fertilizer due to the excess $NH_4^+$ and $K^+$ content.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A process for treating manure in order to isolate a target precipitate, said process comprising:
    (a) providing a manure slurry;
    (b) acidifying the manure slurry to instigate nutrient release therefrom, wherein the acidification of the manure slurry comprises bubbling the manure slurry with $CO_2$-enriched gas and adding at least one acid to the manure slurry, and wherein acidification occurs for time in a range from about 10 minutes to about 200 minutes;
    (c) separating nutrient-rich solution from nutrient-deficient solids;
    (d) precipitating the target precipitate by introducing at least one base to the nutrient-rich solution; and
    (e) collecting the target precipitate,
    wherein the at least one acid is selected from the group consisting of hydrochloric acid, sulfuric acid, and combinations thereof.

2. The process of claim 1, wherein a target pH of the acidified manure slurry is in a range from about 4.5 to about 5.5.

3. The process of claim 1, wherein a pH of the nutrient-rich solution is raised to a range of about 8 to about 10 to initiate precipitation of the target precipitate.

4. The process of claim 3, wherein the at least one base is selected from the group consisting of sodium hydroxide, potassium hydroxide, magnesium hydroxide, and combinations thereof.

5. The process of claim 1, further comprising sparging the nutrient-rich solution with air during precipitation.

6. The process of claim 1, wherein the target precipitate comprises struvite and/or potassium struvite.

7. The process of claim 1, wherein the manure slurry provided can have a mass concentration of manure in solution in a range from about 10 g/L to about 1000 g/L.

8. The process of claim 1, wherein the steps (a) through (e) can be repeated more than once.

9. The process of claim 1, further comprising collecting and reusing nitrogen- and potassium-rich effluent remaining after precipitation of the target precipitate.

10. The process of claim 1, wherein acidification is conducted in a continuous flow or a sequencing batch mode.

11. The process of claim 1, wherein acidification comprises bubbling the manure slurry with $CO_2$-enriched gas and when a pH of the manure slurry reaches a range of greater than 5.5 to about 6.5, the at least one acid is added to the manure slurry until the pH reaches a range of about 4.5 to less than 5.5.

12. The process of claim 1, wherein step (d) comprises adding at least one base to the nutrient-rich solution and once a pH of about 7 is reached, sparging the nutrient-rich solution with air with continued addition of the at least one base until a pH of about 8 to about 10 is reached.

* * * * *